Sept. 27, 1955     T. P. WALLACE     2,718,669
DOUBLE-MOTING SUCTION-TYPE BRUSHLESS LINTER GIN
Filed May 16, 1952
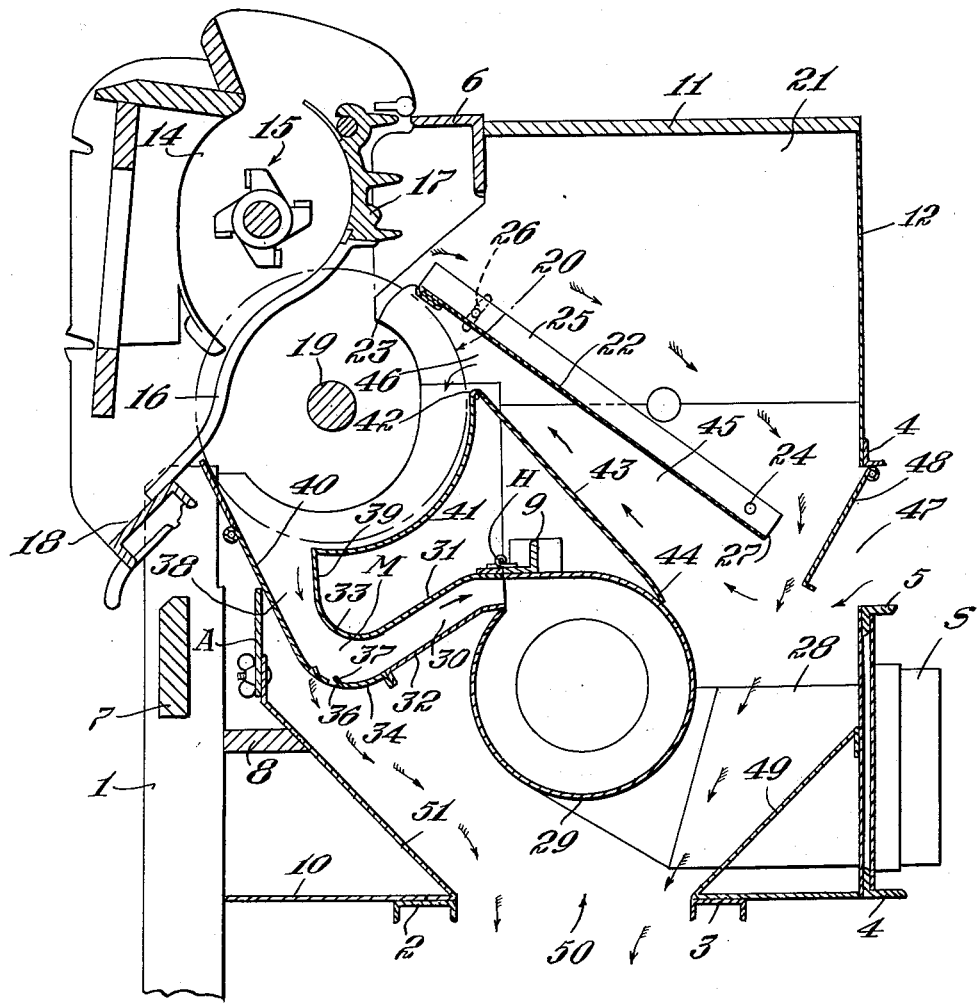
Inventor
Thomas P. Wallace

United States Patent Office 2,718,669
Patented Sept. 27, 1955

2,718,669

DOUBLE-MOTING SUCTION-TYPE BRUSHLESS LINTER GIN

Thomas P. Wallace, Memphis, Tenn., assignor to The Murray Company of Texas, Inc., Dallas, Tex., a corporation of Delaware Application May 16, 1952, Serial No. 288,092

5 Claims. (Cl. 19—59)

This invention relates to linter gins of the so-called brushless, or suction-type, an example of which is illustrated in the patent to Graebe No. 2,438,047 dated March 16, 1948, wherein provision is made for overhead moting as well as for moting below the saw cylinder. In the gin disclosed in the above patent the initial moting takes place at a point to the rear of the saw cylinder and approximately in the horizontal plane of the axis of the saw cylinder, the heavy motes and some useful lint being expelled centrifugally into an overhead mote-receiving chamber from which the motes are removed in any appropriate way. The interior of the gin is at subatmospheric pressure and a large percentage of the air current which flows from the gin enters through the overhead mote-receiving chamber and in approaching the saw cylinder carries with it any useful lint which has entered the mote-receiving chamber. This air, with entrained lint, is carried along between the periphery of the saw cylinder and an arcuate guard concentric with the latter. The useful lint which is picked up by this air current, together with that which is carried along by the saw teeth, is discharged radially from the saw cylinder into a delivery throat leading down from the lower part of the saw cylinder into an underneath moting chamber from which the useful lint is carried by the air current into the delivery flue.

In the gin herein chosen for illustration of the present invention, the underneath moting chamber has a concave floor along which the air current sweeps, the motes hugging the surface of this floor and being discharged through transverse slots guarded by baffles. The lint, being lighter, fails to follow the curved floor closely enough to be discharged and is carried along by the air current to the desired delivery point. As above described, the air for stripping the lint from the saw cylinder enters, in large proportion, through the overhead mote-receiving chamber and as its direction of flow is opposite to that of motes centrifugally expelled into the mote-receiving chamber, the efficiency of overhead moting is diminished, since many of the motes are returned by the air current and picked up again by the saw teeth.

The present invention has for one of its objects the improvement of overhead moting, in particular by reducing the flow of air from the overhead mote-receiving chamber toward the saw cylinder, but without lessening the quantity or velocity of air available for stripping lint from the saw or for conveying the useful lint away. A further object is to provide for the admission of air to the saw cylinder at such a point that it will not oppose the centrifugal expulsion of heavy motes into an overhead moting chamber to the rear of the saw cylinder. A further object is to provide for the controlled flow of air toward the saw cylinder but without establishing a current of appreciable volume, moving oppositely to the direction of the centrifugally ejected motes. A further object is to provide for the admission of air to the saw cylinder between the point at which motes are centrifugally expelled into an overhead mote-receiving chamber but above the point at which the useful lint is pneumatically stripped from the saw cylinder into the discharge throat. A further object is to provide a linter gin of simple and durable construction which delivers lint of a higher cellulose content than gins customarily in use. Other and further objects and advantages of the invention will be pointed out in the following more detailed description and by reference to the accompanying drawing which is a diagrammatic, front-to-rear vertical section through a linter gin embodying the present invention.

Referring to the drawing, the numeral 1 designates one of the upright members of the gin frame, the frame and the casing of the gin being in general of conventional form and construction, the frame including suitable transverse members such as the parts 2, 3, 4, 5, 6, 7, 8, etc., which extend from one end wall to the other of the gin, some of which constitute supports for the operative elements of the gin. The casing of the gin, as here illustrated, comprises the floor 10, the top panel 11, the rear wall 12, and end panels at the right and left-hand ends of the gin, all of generally conventional construction, the casing being air-tight except for such ports or openings as are intended to admit inward flow of air, the interior of the casing being maintained at a subatmospheric pressure as is usual in brushless, suction-type gins of this type.

At the forward part of the gin there is provided a roll box 14 within which is arranged the float roll 15, which presents the roll of seed cotton to the grate-fall 16 whose bars are supported at their upper ends by the transverse member 17, and which at their lower ends are supported by the seed board 18. The shaft 19 of the saw cylinder is arranged below the grate-fall and carries the saws constituting the saw cylinder whose peripheral surface is indicated by the numeral 20, it being understood that the diameter of the saw cylinder will vary from time to time as the saws are worn down and sharpened.

To the rear of the saw cylinder and within the casing there is located the overhead moting chamber 21 having the floor 22 which, as here illustrated, is a thin panel, for example, of sheet metal, having its upper forward edge 23 located closely adjacent to the periphery of the saw cylinder and, as here shown, in a horizontal plane which is spaced a substantial distance above the horizontal plane of the axis of the saw cylinder. This floor 22 extends rearwardly and downwardly, terminating at the edge 27 which is spaced from the rear wall 12 of the casing for a purpose hereinafter described. The moting chamber floor 22, as here illustrated, has stiffening flanges 25 at its opposite ends which are disposed adjacent to the inner surfaces of the opposite end panels of the gin casing. As here illustrated, the floor is pivotally supported at 24, to swing about a horizontal axis near its lower rear end, and pin and slot adjusting means 26, of conventional type, is provided whereby the upper end of the floor may be adjustably moved up or down so that the edge 23 may be disposed closely adjacent to the periphery of the saw cylinder according to the varying diameter of the latter.

A suction pipe S leads from the rear of the gin to a suitable source of low pressure, for example a fan blower, the rear wall of the gin having an opening with which the end of this pipe registers. Inside of the gin casing there is arranged a pipe 28, coaxial with the pipe S and having leak-tight connection with the latter, the pipe 28 extending forwardly and being joined at its forward end to a transversely extending sheet metal cylinder 29 whose opposite ends are closed and disposed adjacent to the opposite end panels of the gin casing. A lint delivery conduit 30, reaching from one end panel to the other of the casing, enters the upper part of cylinder 29 in tangential relation to the latter, this conduit 30 having upper and lower walls 31 and 32 which merge smoothly with the roof 33 and floor 34 of a moting space M below the saw cylinder. The concave floor 34 of this moting space M is provided with one or more transversely extending slots 36, each slot having a forwardly and upwardly inclined baffle 37. The moting space M merges with the lower end of a lint delivery throat 38 having the rear wall 39 and the forward wall 40, the latter inclining upwardly and forwardly and terminating closely adjacent to the grate-fall 16. The upper edge of the vertical rear wall 39 of the throat is closely adjacent to the periphery of the saw cylinder and is joined, as here shown, integrally with the lower edge of a curved guard 41 which is substantially concentric with the periphery of the saw cylinder and spaced a short distance from the latter, thereby providing a narrow passage between the guard and the periphery of the saw cylinder along which a current of air, entrained by the rotating saw cylinder, moves downwardly toward the throat 38. The throat structure and guard are desirably mounted for adjustment, as by means of a hinged support at H, to compensate for changes in the diameter of the saw cylinder.

As here illustrated, the guard 41 terminates at the point 42 in a horizontal plane slightly above that of the axis of the saw cylinder, but spaced below the edge 23 of the floor 22, and from the point 42 an integral continuation of the guard, indicated at 43, extends downwardly and rearwardly with its rear edge portion 44 resting upon the outer surface of the cylinder 29. This member 43 constitutes a partition, forming the bottom wall of an air passage 45 whose upper wall is formed by the lower surface of the floor 22 and which is here shown as tapering in vertical dimensions toward its delivery end 46 immediately above the upper edge 42 of the guard 41.

Directly to the rear of the lower end of the floor 22 the rear wall 12 of the casing is provided with an air inlet aperture 47 which is here shown as provided with the adjustable closure member 48 which may be swung about its upper edge so as to vary the effective size of the aperture 47. This member 48 also constitutes a mote-deflecting guide, as hereafter described. In the lower, rear part of the casing there is provided a stationary downwardly and forwardly inclined deflector 49 which terminates at the rear edge of a mote-discharge aperture 50 in the front of the casing and at the forward, lower part of the casing there is provided a stationary, downwardly and rearwardly inclined deflector 51 whose lower edge coincides with the forward edge of the aperture 50.

In the drawing, the feathered arrows indicate the direction of movement of motes while the plain arrows illustrate the movement of air currents. It will be observed that motes are thrown off from the upper portion of the periphery of the saw cylinder into the overhead moting chamber 21 and travel downwardly in the direction of the feathered arrows, eventually dropping downwardly between the lower edge 27 of the moting chamber floor 22 and the deflector 48 and then falling downwardly past the pipe 28 and onto the deflector 49 and thence out through the aperture 50. Any suitable means may be provided for collecting or conveying away the motes which fall through the aperture 50. If desired, an adjustable door A may be provided, for admitting a regulated quantity of air to enter the space below the part 34.

By reason of the low pressure maintained within the gin casing, aided by the entraining action of the saw cylinder, air enters the aperture 47 in the rear wall of the casing and follows the direction of the plain arrows, passing underneath the floor 22 and eventually entering the space between the periphery of the saw cylinder and the guard 41 and, moving along with the saw cylinder, passes down into the throat 38, thence through the moting space M and into the cylinder 29, and thence outwardly through the pipes 28 and S. Fine motes, dust and hull-pepper, carried downwardly through the throat 38 with the air current into the space M, are swept out through the slots 36 and move downwardly and escape through the aperture 50. The useful lint, stripped from the saw cylinder by the air current into the throat 38 is swept along by the air current through the conduit 30 into the cylinder 29 and thence out through the pipes 28 and S.

It will be observed that the aperture 47 is of substantial size and thus air in considerable volume is able to enter at this point. The deflector 48 assists in preventing this air from entering the overhead moting chamber 21, most of the air entering directly into the air passage 45. Any fine particles of lint which may have been thrown off into the overhead moting chamber 21 are caught by this air current as they pass downwardly between the lower end of the floor 27 and the deflector 48 and are thus returned to the saw cylinder. On the other hand, since heavy motes thrown off into the chamber 21 do not meet any opposing air currents in said air chamber they do not return to the saw cylinder and being relatively heavy they drop downwardly through the air current entering at the aperture 47 without being diverted sufficiently to be picked up by the air current entering in the passage 45.

The air in the overhead moting chamber 21 is substantially quiescent because sufficient air enters through the passage 45 to satisfy the entraining action of the saw cylinder and the suction effect within the gin casing and thus, as above noted, there are no appreciable air currents in the chamber 21 to oppose the centrifugal expulsion of motes into said chamber or of sufficient intensity to return motes toward the saw cylinder after they have been ejected from the latter.

Thus, with this simple construction, many of the difficulties inherent in the operation of customary types of gin have been overcome, the motes, hull-pepper, dust and other materials are more perfectly removed, and the resultant lint is cleaner and of a higher grade than that produced by usual gins so that the product brings a higher price and requires less subsequent cleaning than has been necessary when the lint is removed by ginning mechanisms of customary prior types.

While one desirable embodiment of the invention has herein been disclosed by way of example it is to be understood that the invention is broadly inclusive of any and all modifications falling within the scope of the appended claims.

I claim:

1. In a brushless, suction-type linter gin having a casing in which a subatmospheric pressure is maintained and which has an overhead moting chamber into which motes are delivered by a saw cylinder and wherein an imperforate guard, substantially concentric with the saw cylinder, extends about the lower rear quadrant of the saw cylinder, the lower edge of the guard joining the upper edge of a member forming the rear wall of a downwardly directed delivery throat, a floor for the overhead moting chamber, the forward edge of the floor being adjacent to the periphery of the saw cylinder and the rear edge of the floor being spaced from the rear wall of the casing thereby to provide an escape port from the overhead moting chamber through which solid particles expelled by the saw cylinder into the overhead moting chamber may drop into the lower part of the casing, means defining an upwardly and forwardly inclined convergent passage, whose delivery end is between the forward edge of the floor of the overhead moting chamber and the upper edge of the guard, through which air may approach the saw cylinder and enter the space between the latter and the guard without passing through the overhead moting chamber, and means whereby air at atmospheric pressure may enter the rear end of said passage, the escape port from the overhead moting chamber being so located, relatively to the entrance to said air passage, that useful lint which passes down through the escape port is entrained by the air entering said passage and delivered into the space between the saw cylinder and the guard.

2. In a brushless, suction-type linter gin comprising a casing having therein an overhead moting chamber, a saw cylinder which delivers motes into said overhead moting chamber, means within the casing defining a delivery conduit in which subatmospheric pressure is maintained, means defining a delivery throat which extends downwardly from a point adjacent to the lower periphery of the saw cylinder and through which lint, stripped from the saw cylinder, is carried by an air current into the delivery conduit, the delivery throat having front and rear walls, an imperforate guard extending upwardly and rearwardly through substantially a quadrant of arc in substantially concentric relation to the saw cylinder from the rear wall of the delivery throat, in combination, a downwardly and rearwardly sloping floor for the overhead moting chamber whose forward edge is in close proximity to the periphery of the saw cylinder and in a horizontal plane above that of the axis of the saw cylinder, the floor being adjustable whereby its forward edge may be kept in close proximity to the periphery of the saw cylinder as the diameter of the saw cylinder changes during use, and an air-directing partition below the floor of the overhead moting chamber, said partition sloping downwardly and rearwardly more steeply than the floor of the moting chamber and having its forward edge joined to the upper edge of said curved guard, the floor of the moting chamber and said partition defining an upwardly and forwardly convergent air passage through which air may approach the saw cylinder without passing through the overhead moting chamber, the rear edges of the floor and partition respectively being spaced forwardly from the rear wall of the casing and the casing having an aperture in its rear wall through which air may enter into the space between the rear edges of the floor and partition.

3. In a brushless suction-type linter gin of the kind having a casing wherein sub-atmospheric pressure is maintained and in which the lint is removed from the saw cylinder by suction means, the gin including a roll-box, grate-fall, and saw cylinder and having an overhead moting chamber to the rear of the saw cylinder, said moting chamber having a floor which inclines upwardly and forwardly and whose forward edge is closely adjacent to the periphery of the saw cylinder and spaced from the top wall of the casing to provide an entrance through which motes discharged from the saw may enter said moting chamber, an upwardly and forwardly inclined partition, below the floor of the moting chamber and cooperative with said floor to provide a forwardly and upwardly convergent air passage immediately below said floor and whose delivery end is close to the periphery of the saw cylinder, an imperforate curved shield extending downwardly and forwardly, in close adjacency to the periphery of the saw cylinder, from the forward edge of said inclined partition to a point below the saw cylinder, means defining a delivery throat whose rear wall extends down from the lower edge of said curved shield, means defining an educt passage, means defining a mote-separating space below the saw cylinder with which the throat merges and wherein sub-atmospheric pressure is maintained thereby creating an air current for sweeping the lint from the saws, said mote-separating space having a floor and a roof and communicating with a lint delivery conduit which has upper and lower walls, the upper surface of the floor of the mote-separating space comprising a concave portion which merges with the lower wall of the lint delivery conduit, means continuing the floor of the moting space substantially to the grate-fall, said floor having a narrow transversely extending delivery aperture through which motes are ejected, and a baffle blade extending upwardly and forwardly from the rear edge of said aperture, the casing having an aperture in its rear wall through which air may enter the rear end of said upwardly inclined air passage, the rear edge of the floor of the overhead moting chamber being spaced from the rear wall of the casing and being located above said aperture thereby permitting solid particles to drop from the moting chamber, the rear edge of the inclined partition also being spaced from the rear wall of the casing and being located below said aperture whereby solid particles, dropping from the moting chamber, must pass through air entering said aperture on its way into the rear end of said inclined air passage.

4. In combination in a brushless linter gin of the kind wherein the lint is removed from the saw cylinder by suction, and wherein a casing houses a roll-box, a grate-fall, a saw cylinder, and means defining an overhead moting chamber to the rear of the saw cylinder and having a floor whose forward edge is closely adjacent to the periphery of the saw cylinder and in a horizontal plane above that of the axis of the saw cylinder and which defines the lower edge of an entrance to said moting chamber, and upwardly and forwardly inclined imperforate partition below the floor of the moting chamber and which is inclined more steeply to the horizontal than is the floor of the moting chamber thereby cooperating with the latter to provide an upwardly and forwardly convergent air passage whose delivery end is close to the periphery of the saw cylinder and immediately below the entrance to the overhead moting chamber, an impervious curved shield extending downwardly and forwardly, in close adjacency to the periphery of the saw cylinder, from the forward edge of said inclined partition to a point below the saw cylinder, means defining a delivery throat extending downwardly from the lower portion of the periphery of the saw cylinder, means defining a passage into which the delivery throat discharges, said passage having a wall comprising a curved portion and a straight portion, the curved portion being constructed and arranged to cause air, entering the passage from the delivery throat, to be deflected through an arc of approximately 90°, thereby creating centrifugal force which presses entrained dust and heavy particles against said wall, said wall having a transversely extending narrow delivery port through which motes carried by the air current sweeping along said wall are ejected, a baffle blade extending upwardly and forwardly from the rear edge of said aperture, means providing a space through which motes and useful lint which enter the overhead moting chamber may fall freely, the aforesaid air passage extending from the forward part of said space, the casing having an aperture in its rear wall opening into the rear part of said space and through which air flows into and across said space into the entrance to said air passage, and adjustable means for varying the location of the upper edge of the aperture in the rear wall of the casing.

5. In combination, in a suction-type, brushless gin having a casing wherein sub-atmospheric pressure is maintained and which has top, rear and side walls, a saw cylinder and grate-fall within the casing, and means defining an overhead moting chamber within the casing into which motes and some useful lint are expelled by the saw cylinder, said moting chamber having a floor whose forward edge is closely adjacent to the periphery of the saw cylinder at a point above the horizontal plane of the axis of the saw cylinder and whose rear edge is spaced from the rear wall of the casing thereby to permit motes and useful lint which enter the moting chamber to fall freely from the rear edge of said floor, means defining an air passage immediately below the floor of said moting chamber, said passage converging upwardly and forwardly from adjacent to the rear edge of said floor to the periphery of the saw cylinder and being operative to deliver a lint-carrying air current to the periphery of the saw cylinder at a point immediately below the forward edge of the floor of the moting chamber, the rear wall of the casing having an air inlet opening located adjacent to the rear end of said air passage, and means associated with said air inlet opening for directing air, which enters through said opening, away from the moting chamber.

References Cited in the file of this patent

UNITED STATES PATENTS

| 552,382 | Lumpkin et al. | Dec. 31, 1895 |
| 1,028,701 | Fordyce | June 4, 1912 |
| 1,265,014 | West | May 7, 1918 |
| 1,426,687 | Vardell | Aug. 22, 1922 |
| 2,275,755 | Grimes | Mar. 10, 1942 |
| 2,310,598 | Ricker | Feb. 9, 1943 |
| 2,318,737 | Blaylock | May 11, 1943 |
| 2,588,593 | Vandergriff | Mar. 11, 1952 |
| 2,622,280 | Graebe | Dec. 23, 1952 |